(12) United States Patent
Anthony

(10) Patent No.: US 6,270,631 B1
(45) Date of Patent: Aug. 7, 2001

(54) METHOD FOR CONDITIONING FLUIDISED BED COMBUSTOR ASHES

(75) Inventor: Edward J. Anthony, Ottawa (CA)

(73) Assignee: Her Majesty the Queen in right of Canada, as represented by the Minister of Natural Resources, Ottawa (CA)

(*) Notice: Subject to any disclaimer, the term of this patent is extended or adjusted under 35 U.S.C. 154(b) by 0 days.

(21) Appl. No.: 09/581,469

(22) PCT Filed: Dec. 14, 1998

(86) PCT No.: PCT/CA98/01172

§ 371 Date: Aug. 9, 2000

§ 102(e) Date: Aug. 9, 2000

(87) PCT Pub. No.: WO99/31026

PCT Pub. Date: Jun. 24, 1999

(30) Foreign Application Priority Data

Dec. 15, 1997 (CA) .................................................. 2224901

(51) Int. Cl.[7] .............................. C01F 1/00; C01F 11/02
(52) U.S. Cl. .............................. 204/157.42; 204/157.51; 423/164; 423/640
(58) Field of Search .................................. 423/164, 640; 204/157.42, 157.51

(56) References Cited

U.S. PATENT DOCUMENTS

| | | |
|---|---|---|
| 3,941,552 * | 3/1976 | Cottell ........................................ 431/2 |
| 4,302,485 | 11/1981 | Last et al. . |
| 4,411,879 * | 10/1983 | Ehrlich et al. ........................ 423/640 |
| 4,941,134 | 7/1990 | Nyberg et al. . |
| 5,380,411 | 1/1995 | Schlief . |
| 5,387,739 | 2/1995 | Pichat . |
| 5,466,367 | 11/1995 | Coate et al. . |

FOREIGN PATENT DOCUMENTS

| | | |
|---|---|---|
| 3 401 847 | 1/1985 | (DE) . |
| 3401847 * | 8/1985 | (DE) . |
| 1074099 * | 6/1967 | (GB) . |
| 463352 * | 11/1990 | (SE) . |
| 881050 * | 11/1981 | (SU) . |

* cited by examiner

*Primary Examiner*—Edna Wong
(74) *Attorney, Agent, or Firm*—Robert A. Wilkes

(57) ABSTRACT

A process for hydrating CaO residues in fluidized bed combustor ashes that achieves a better level of hydration, which does not add significantly to the cost of the hydration process, which reduces the consumption of water in the hydration process, and which if desired can trap at least some of the $CO_2$ in the furnace gasses, by using some of it to convert the hydrated CaO to $CaCO_3$. This both reduces the amount of $CO_2$ released to the atmosphere, and converts the potentially dangerous CaO in the ashes into an effectively inert and benign material. By exposing the ash/water mixture to sound under the correct conditions of frequency, and power input, it is possible to improve both the rate of hydration, and the level of hydration, of FBC ashes. The process can be carried out either batchwise or continuously, and does not require an extended time period.

25 Claims, 1 Drawing Sheet

METHOD FOR CONDITIONING FLUIDISED BED COMBUSTOR ASHES

BACKGROUND OF THE INVENTION

It is well known that in the combustion of carbonaceous fuels, such as coal, the sulphur contained therein is oxidised, usually largely to sulphur dioxide, although under certain conditions some sulphur trioxide can be formed. Whilst a small proportion of this sulphur dioxide can be chemically combined as sulphite (or sulphate if sulphur trioxide is present) into the ash formed largely from the non-combustible materials in the fuel, most of the sulphur dioxide is vented from the furnace combustion zone as part of the exhaust gasses. In the past these furnace exhaust gasses containing sulphur dioxide have been vented to the atmosphere through a stack, but this is no longer possible, due to ecological damage caused by such acidic emissions, including the formation of acid rain. The only known effective way to reduce the release of sulphur oxides to an acceptable level is to capture the sulphur oxides chemically from the furnace exhaust gasses before they are vented to atmosphere.

One method that is extensively used to capture sulphur oxides is to add an alkaline reacting solid additive to the hot furnace gasses to react with the sulphur oxides. The most commonly used additive is a particulate material derived from limestone, and it is usually added to the combustion zone of the furnace. Four reactions involving the limestone material are theoretically possible:

(a) $CaCO_3 \rightarrow CaO+CO_2$, (b) $CaO+SO_2 \rightarrow CaSO_3$, (c) $2CaO+2SO_2+O_2 \rightarrow 2CaSO_4$, and (d) $CaO+SO_3 \rightarrow CaSO_4$.

In the conditions that exist in the combustion zone of a fluidised bed combustor furnace, or FBC, sulphur trioxide is generally present in only relatively low levels, so that the last of these reactions is of little importance. As a result, the furnace ash residues typically comprise a heterogeneous mixture of CaO, $CaSO_4$, limestone, unreacted carbonaceous char derived from the fuel and fuel derived ash materials, which are primarily inorganic compounds. This technique is particularly suitable for modern fluidised bed combustors (FBC's).

All of these known processes utilising a more or less dry particulate additive show poor utilisation of the added reagent, in the sense that in order to reduce significantly the amounts of sulphur dioxide, and of sulphur trioxide if present, in the furnace gasses prior to venting to the atmosphere, a substantial excess of the reagent has to be used, above the theoretical requirements of the reactions set out earlier. This is particularly true for the most commonly used reagent, which is either limestone as such (substantially $CaCO_3$), lime (CaO), or hydrated lime ($ca(OH)_2$ plus some CaO). Although limestone is a relatively low cost material, both limestone, lime and hydrated lime are poorly utilised in the sulphur dioxide capture process, with utilisation figures in the range of 30%–40% being considered good.

Poor utilisation of the lime or limestone with its adverse effect on furnace operation costs, also provides a furnace ash which poses disposal problems. Since sulphur dioxide capture in the furnace is generally inefficient, FBC ashes commonly contain up to at least about 20% of free CaO. An FBC ash containing this amount free CaO cannot simply be dumped. It can generate dangerously high temperatures in contact with water, and landfill sites containing it are both unstable and generate a water leachate with an unacceptably high alkaline pH in the range of between 11 and 12. This leachate too requires treatment before it can be safely discharged. Further, over extended time periods in such a landfill site these ashes are found to be subject to considerable expansion, which both affects dump stability and produces yet more alkaline leachate requiring treatment.

In order to mitigate these difficulties, FBC ashes are generally subjected to a two stage CaO hydration procedure. First, the ash solids are mixed with water, generally in a pug mill. Then the wet solids are treated with further water at the disposal site, in part to complete the hydration process and in part to achieve optimum solids density. The second addition of water allows cementitious reactions involving the other components in the ash to go to completion, which should improve the overall strength and durability of the landfill site.

This method suffers from several disadvantages. Chemical analysis of the hydrated ash shows that at the end of the two stage process the hydration reaction is not complete, and at most only about 70–80% of the CaO in the ash is hydrated. It is also found that the water losses encountered due to steam formation in hydrating the ash are quite high, and can range as high as 40–50% by weight of the ash being treated, even though the theoretical water requirement for an average ash containing about 18% free CaO is only approximately 6% by weight of the ash being treated. It is also found that the hydration reaction at ambient temperatures is slow, and may take hours, or even days, to reach a reasonable level of completion.

Several methods have been proposed whereby better hydration of FBC ashes may be obtained.

It has been proposed to increase the reaction rate by increasing the water temperature. In the so-called Pyropower method, water at 98° C. is recommended. In the so-called CERCHAR process a pressurised hydration reactor is used. Both of these methods whilst proffering a better level of hydration, increase significantly the cost of the hydration process.

A need therefore exists for a faster, less expensive and more effective way of hydrating at least a major portion of the CaO content of FBC ashes.

SUMMARY OF THE INVENTION.

This invention seeks to provide a process for hydrating CaO residues in FBC ashes that both achieves a better level of hydration, which does not add significantly to the cost of the hydration process, and which reduces the consumption of water in the hydration process. Further, as an adjunct to the hydration process, it is possible to trap at least some of the $CO_2$ in the furnace gasses, by using some of it to convert the hydrated CaO to $CaCO_3$. This both reduces the amount of $CO_2$ released to the atmosphere, and converts the potentially dangerous CaO in the ashes into an effectively inert and benign material. In the hydration process according to this invention the reaction between the solid ashes and the liquid water is activated sonochemically. By exposing the ash/water mixture to sound under the correct conditions of frequency and power input it is possible to improve both the rate of hydration, and the level of hydration, of FBC ashes. The process can be carried out in a single step, and does not require an extended time period.

DETAILED DESCRIPTION OF THE INVENTION

In the process according to this invention the rate of the solid/liquid reaction between the hydration water and the CaO in the ashes is enhanced by sonic irradiation. It is known that ultrasound irradiation can enhance chemical reaction rates by up to two orders of magnitude in some cases. In some cases this appears to be as a result of better mixing. In others it appears to be as a result of a cavitation phenomenon which has been postulated to involve the production of micro scale transient bubbles with extremely high temperatures, and which generate shockwaves on implosion. It is also known that ultrasonic irradiation can cause pitting of solids, and strong shearing forces at the liquid/solid interface which can significantly enhance mass transfer processes across the interface. Very little is known about the influence of sonic radiation, that is sound radiation at frequencies within the audible range, on chemical reactions.

It has now been found that even though the CaO in FBC ashes is only one component of several in a complex mixture, sonic activation of the hydration reaction is feasible, and appears to be both effective and economical in comparison with the currently used or available methods. Sonochemical activation appears to provide a hydration process that can achieve hydration levels in excess of 80% in a relatively short time without excessive water consumption, and appears to be more effective and economical in comparison with the currently used or available methods. Further, it appears that a wide range of sonic radiation frequencies can be used, and the process of this invention is not limited to ultrasonic radiation with a frequency of the order of about 20 kHz; frequencies below about 1,000 Hz and as low as about 400 Hz also appear to be effective.

Thus in a first broad embodiment this invention seeks to provide a process for hydrating calcium oxide contained in ashes derived from a fluidised bed combustor in which a sulphur bearing carbonaceous fuel is burnt in the presence of calcium oxide or a material capable of providing calcium oxide, which process comprises:

(a) recovering calcium oxide containing ashes from the fluidised bed combustor;

(b) mixing the recovered ashes with at least enough water to provide full hydration of the calcium oxide contained in the ashes;

(c) transferring the mixture of ashes and water to a sonochemical reactor;

(d) exposing the mixture of water and ashes in the reactor to sonic radiation at a power level and at a frequency sufficient to cause the hydration reaction to proceed to an acceptable level; and (e) recovering from the reactor a sufficiently hydrated ash product.

Preferably, the process is operated batchwise. More preferably, the process is operated continuously, and most preferably receives a flow of calcium oxide containing ashes directly from an operating fluidised bed combustor.

Preferably, the flow of calcium oxide containing ashes is converted into a flowable slurry for transfer to the sonochemical reactor by admixture with water.

Preferably, the sonic radiation has a frequency in the ultra sonic range, and conveniently the sonic radiation has a frequency of the order of 20,000 Hz. Alternatively, the sonic frequency is in the audible range, and conveniently the sonic radiation has a frequency of less than about 1,000 Hz, and more conveniently has a frequency from about 400 Hz to about 500 Hz.

Preferably, at least about 80% of the calcium oxide contained in the ashes is hydrated, so that the hydrated ash product contains less than 20% of the calcium oxide initially present.

In an alternative embodiment of the process of this invention, $CO_2$, for example comprising at least some of the $CO_2$ in the flue gasses, is added to the water/ashes mixture which is subjected to sonic radiation. Under these circumstances the following three reactions occur during the sonic radiation step:

(i) $CaO + H_2O \rightarrow Ca(OH)_2$ (ii) $CO_2 + H_2O \rightarrow H_2CO_3$ (iii) $Ca(OH)_2 + 2H_2CO_3 \rightarrow Ca(CO_3)_2 + 2H_2O$.

These have the overall effect of converting the dangerous CaO in the ashes into benign calcium carbonate.

Thus in a second broad embodiment this invention seeks to provide a process for hydrating calcium oxide contained in ashes derived from a fluidised bed combustor in which a sulphur bearing carbonaceous fuel is burnt in the presence of calcium oxide, or a material capable of providing calcium oxide, which process comprises:

(i) receiving a flow of calcium oxide containing ashes from the fluidised bed combustor;

(ii) mixing the ashes with at least enough water to provide full hydration of the calcium oxide contained in the ashes;

(iii) providing to the mixture of ashes and water sufficient carbon dioxide to convert a desired amount of the hydrated calcium oxide to calcium carbonate;

(iv) transferring the mixture of ashes and water either before or after step (iii) to a sonochemical reactor;

(v) exposing the mixture of water, carbon dioxide and ashes in the reactor to sonic radiation at a power level and at a frequency sufficient to cause the hydration reaction to proceed to an acceptable level; and (vi) recovering from the reactor a hydrated ash product containing calcium carbonate.

DESCRIPTION OF THE PREFERRED EMBODIMENT

Figure 1:
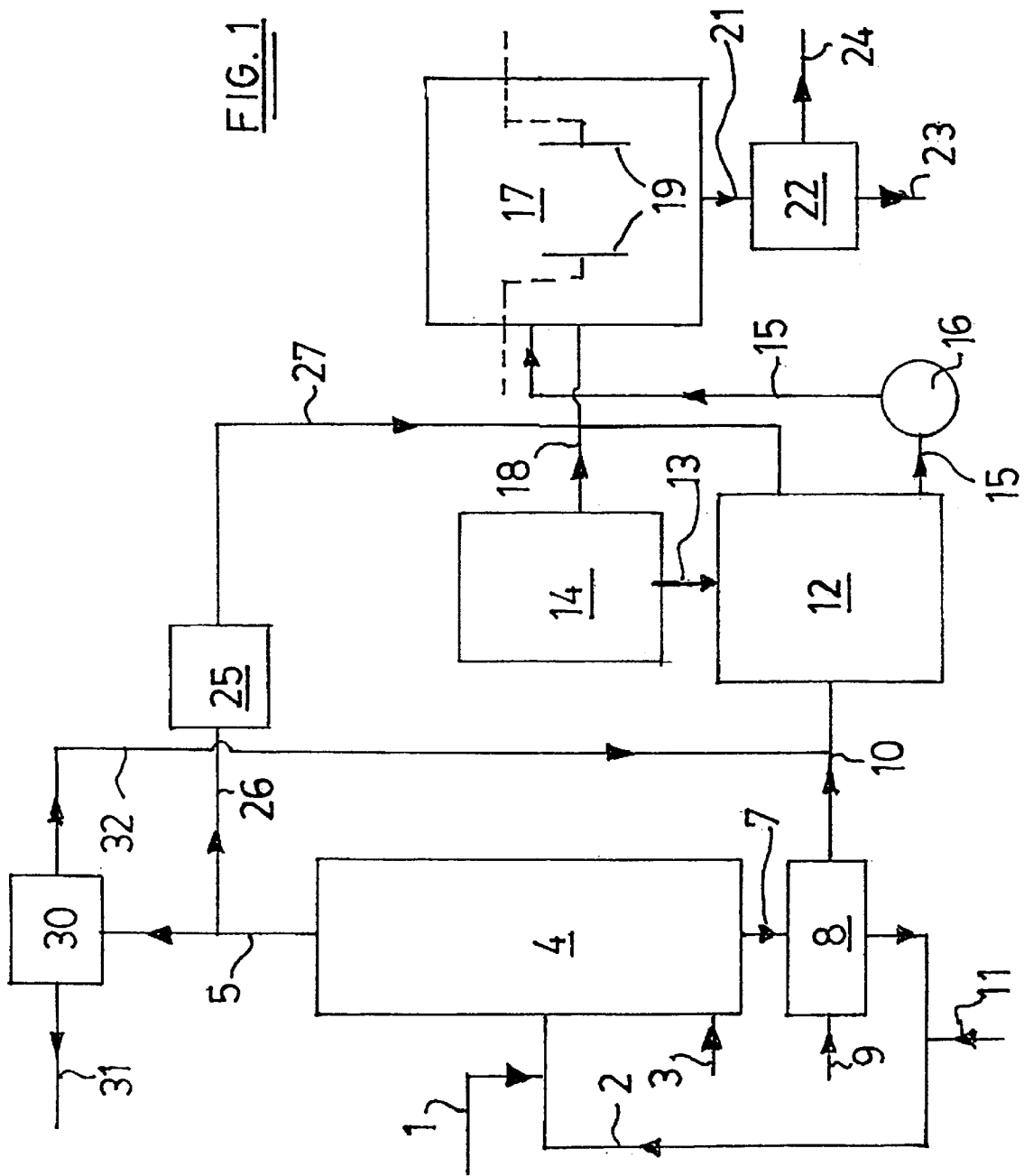
FIG. 1 shows in schematic form a continuous process using this invention.

FIG. 1 shows in schematic form the layout of a first and a second embodiment of this invention in which ash from an FBC is treated continuously, more or less as fast as it is produced.

In the first embodiment, carbonaceous fuel, typically coal, containing sulphur is fed to the combustor in line 1, admixed with bed solids, in line 2, and passed into the FBC 4. The bed solids are generally a heterogenous mixture of char, ashes, unreacted lime containing materials, and sand. Air is also passed into the FBC from line 3 both to provide oxygen for combustion, and to fluidise the fuel/solids mixture. After combustion, hot flue gas exits the FBC through line 5, and a mixture of ashes and fluidising solids exits the FBC through line 7. The mixture in line 7 is passed into the separator 8, which is fed with air from line 9, and a separation is effected between a beds solids fraction which returns to the FBC through line 2, and an ashes fraction which leaves through line 10. Any make-up solids required to maintain an adequate quantity for the FBC are added through line 11. The calcium based capture material, which is typically limestone, can be added with the carbonaceous fuel in line 1, or with the make-up solids in line 11.

The ashes in line 10 pass into a water slurry tank 12 which is fed with water through line 13 from tank 14. In the tank 12 sufficient water is added to provide a pumpable slurry, which is transferred through line 15 by means of pump 16 to the sonochemical reactor 17. Further water can be added if required to the reactor through line 18. In the reactor, the water/ashes mixture is subjected to sonic radiation by means of the vibrators 19, which are activated by a source of sonic energy (not shown). After the hydration reaction has proceeded sufficiently, the water/ashes mixture leaves through line 21, to a second separator 22 from which a hydrated ash product leaves through line 23, and water—which advantageously is recycled back to tank 14—leaves through line 24.

In this first embodiment, only a hydration reaction occurs in the reactor 17, and the dwell time of the ash solids therein is adjusted to give the desired level of hydration. If the ashes are to be disposed of to a landfill site, this will generally be to a high level, and at least 80% of the CaO will be hydrated.

In a second embodiment, a $CO_2$ withdrawal system is added, such as line 26, whereby gas is withdrawn from the flue gasses, and passed though a $CO_2$ separator 25, to provide a $CO_2$ rich gas in line 27. This gas is also admixed with the water ashes mixture prior to sonochemical reaction, which is most conveniently carried out in the mixer 12. The added $CO_2$ allows the hydrated ashes to react further, and to provide a hydrated ash product in line 23 which contains calcium carbonate rather than calcium hydroxide. The amount of carbon dioxide added through line 27 largely controls the proportion of calcium hydroxide reacted to calcium carbonate, and will depend on the end use contemplated for the hydrated ash solids obtained from line 23.

In each of these embodiments, the only ash source used is the solids circulating in the fluidised bed itself. In most FBC installations, this is not the only ash source, and significant quantities of ashes are obtained from the furnace off-take gasses, typically in a baghouse filtration system, as shown at 30. The cleaned flue gasses leave the baghouse through line 31. The solids from the baghouse can also be transferred to the same hydration processes, for example through a suitable transfer line 32.

In experiments carried out with FBC ashes admixed with about three times their weight of water, it has been found that by the application of ultrasonic irradiation at a frequency of about 20,000 Hz a hydration level of at least 80% can be achieved in about 20 minutes. A direct comparison with the known hydration processes is difficult, since some heating of the water occurs in the sonochemical process. It has been found that with water at the same temperature as is found in the sonochemical process, a time period of in excess of 40 minutes is required to reach the same level of hydration in the absence of sonic energy. If the ashes are admixed with cold water, as is the case for the sonochemical process, then the time to reach 80% hydration is far higher still.

In these tests, the ultrasonic radiation was obtained by placing an ultrasonic probe into the water/ash mixture. The probe used was a Vibra Cell VCX 600 unit, with a power output of up to 600 watts. In these tests it was also found that the arte of hydration was dependant on the power setting of the probe controlling the amount of sonochemical energy applied to the reaction mixture. As the probe power setting was increased, from 20% to 80%, the level of hydration obtained in 20 minutes increased from about 75% to about 93%.

The embodiments of the invention in which an exclusive property or privilege is claimed are defined as follows:

1. A process for hydrating calcium oxide contained in ashes withdrawn from a combustor having a fluidised bed including circulating solids in which a sulphur bearing carbonaceous fuel is burnt in the presence of calcium oxide, or a material capable of providing calcium oxide, from which combustor a flue gas is vented carrying entrained ashes, which process comprises:
   (a) withdrawing calcium oxide containing ashes from the circulating solids in the fluidised bed;
   (b) mixing the withdrawn ashes with at least enough water to provide full hydration of the calcium oxide contained in the ashes;
   (c) transferring the mixture of ashes and water to a sonochemical reactor;
   (d) exposing the mixture of water and ashes in the reactor to sonic radiation at a power level and at a frequency sufficient to cause the hydration reaction to proceed to an acceptable level;
   (e) recovering from the reactor a sufficiently hydrated ash product; and
   (f) disposing of the hydrated ashes.

2. A process according to claim 1 operated either continuously or batchwise.

3. A process according to claim 1 in which the circulating solids in the fluidised combustor are subjected to a separating step to provide the calcium oxide containing ashes.

4. A process according to claim 1 in which the combustor flue gasses are subjected to a filtration step to provide the calcium oxide containing ashes.

5. A process according to claim 1 in which the circulating solids in the fluidised combustor are subjected to a separating step to provide a proportion of the calcium oxide containing ashes, and the combustor flue gasses are subjected to a filtration step to provide the remainder of the calcium oxide containing ashes.

6. A process according to claim 1 in which the sonic radiation has a frequency in the ultrasonic range.

7. A process according to claim 6 in which the sonic radiation has a frequency of the order of 20,000 Hz.

8. A process according to claim 1 in which the sonic frequency is in the audible range.

9. A process according to claim 8 in which the sonic radiation has a frequency of less than about 1,000 Hz.

10. A process according to claim 9 in which the sonic radiation has a frequency from about 400 Hz to about 500 Hz.

11. A process according to claim 1 in which at least about 80% of the calcium oxide contained in the ashes is hydrated.

12. A process according to claim 1 including the further step of providing to the mixture of ashes and water either before or after transfer of the mixture to the sonochemical reactor in step (c) sufficient carbon dioxide to convert a desired amount of the hydrated calcium oxide to calcium carbonate, and recovering from the reactor a hydrated ash product containing calcium carbonate.

13. A process according to claim 12 operated either continuously or batchwise.

14. A process according to claim 13 operated continuously in which a flow of calcium oxide containing ashes is received directly from the operating fluidised bed combustor.

15. A process according to claim 12 in which the circulating solids in the fluidised combustor are subjected to a separating step to provide the calcium oxide containing ashes.

16. A process according to claim 12 in which the combustor flue gasses are subjected to a filtration step to provide the calcium oxide containing ashes.

17. A process according to claim 12 in which the circulating solids in the fluidised combustor are subjected to a separating step to provide a proportion of the calcium oxide containing ashes, and the combustor flue gasses are subjected to a filtration step to provide the remainder of the calcium oxide containing ashes.

18. A process according to claim 12 in which the sonic radiation has a frequency in the ultrasonic range.

19. A process according to claim 18 in which the sonic radiation has a frequency of the order of 20,000 Hz.

20. A process according to claim 12 in which the sonic frequency is in the audible range.

21. A process according to claim 20 in which the sonic radiation has a frequency of less than about 1,000 Hz.

22. A process according to claim 21 in which the sonic radiation has a frequency from about 400 Hz to about 500 Hz.

23. A process according to claim 12 in which at least about 80% of the calcium oxide contained in the ashes is hydrated.

24. A process according to claim 12 in which in step (b) in addition to the water required for hydration, sufficient additional water is added to the calcium oxide containing ashes to provide a flowable slurry for transfer to the sonochemical reactor.

25. A process according to claim 1 in which in step (b), in addition to the water required for hydration, sufficient additional water is added to the calcium oxide containing ashes to provide a flowable slurry for transfer to the sonochemical reactor.

* * * * *